United States Patent [19]

Lindholm et al.

[11] Patent Number: 4,695,027

[45] Date of Patent: Sep. 22, 1987

[54] INDUSTRIAL ROBOT INSTALLATION

[75] Inventors: Carl-Henrik Lindholm, Viken; Christer Lundström, Enköping, both of Sweden

[73] Assignee: Asea Aktiebolag, Västerås, Sweden

[21] Appl. No.: 869,366

[22] Filed: Jun. 2, 1986

[51] Int. Cl.[4] .............................................. A47H 1/10
[52] U.S. Cl. ..................................... 248/325; 74/469; 248/123.1; 248/280.1; 901/48; 901/42
[58] Field of Search ................... 248/325, 280.1, 123.1, 248/162.1, 297.1; 74/469; 414/719; 212/198, 195; 901/48–50, 42

[56] References Cited

U.S. PATENT DOCUMENTS

| | | | |
|---|---|---|---|
| 4,160,536 | 7/1979 | Krogsrud | 248/280.1 |
| 4,241,891 | 12/1980 | Rudolph | 248/123.1 |
| 4,283,165 | 8/1981 | Vertut | 901/1 X |
| 4,344,595 | 8/1982 | Heller et al. | 248/280.1 X |
| 4,364,535 | 12/1982 | Itoh et al. | 248/280.1 X |
| 4,466,307 | 8/1984 | Kouno | 74/469 X |
| 4,507,043 | 3/1985 | Flatau | 414/719 |
| 4,539,465 | 9/1985 | Bosna | 901/48 X |

FOREIGN PATENT DOCUMENTS 3121333 4/1982 Fed. Rep. of Germany ...... 414/719

Primary Examiner—Ramon O. Ramirez
Attorney, Agent, or Firm—Watson, Cole, Grindle & Watson

[57] ABSTRACT

A robot installation in a production line includes at least one robot (1) of pendulum type, the arm system (10, 14) of which is pivotable about at least one axis (12). The secondary arm (14) of the robot and a counterweight (16) are so displaceably arranged on the primary arm (10) of the robot that the centre of gravity of the arm system lies on or in immediate proximity to the pivot axis (12) independently of the position of the secondary arm (14) on the primary arm (10). To this end, the counterweight (16) and the secondary arm (14) are movably interconnected by means of a rope (18) running around rope wheels (20) at the ends of the primary arm (10). When mounting several robots of this kind on a stand (34, 35) positioned across the production line (31), the robots are mounted symmetrically in pairs on opposed side walls of the overhead stand part (35).

9 Claims, 5 Drawing Figures

INDUSTRIAL ROBOT INSTALLATION

TECHNICAL FIELD

The present invention relates to an industrial robot installation in connection with a production line, for example an assembly line for motor vehicles. The installation comprises at least one robot of pendulum type which exhibits a robot stand rotatable about a first axis, a primary arm which is pivotably journalled in the stand around a second axis oriented transversely across the longitudinal direction of the primary arm, a secondary arm which is movably journalled on the primary arm, and a counterweight arranged on the primary arm for counterbalancing the arm system of the robot.

BACKGROUND ART

When using industrial robots for carrying out various work operations on objects moving along a production line, there is often a need to shorten the operating times at the work stations. This can be done, in principle, by extending the number of robots at the stations in question. However, the existing floor area sets limits to the number of robots that can be accomodated. This has resulted in solutions by which the robot is mounted on an overhead stand which extends across the assembly line. Owing to the weight of the robot, such a stand must be made very strong and stable, since the robot will otherwise cause movements and deformations of the stand with a resultant deteriorated precision as regards the operation of the tool mounted on the tool attachment of the robot. If more robots are mounted on the same stand, this problem will become more evident.

Modern industrial robots normally operate with rapid movements which are repeated very frequently. Such robots are often used for spot welding, and in that connection it is sometimes a requirement from an economic point of view that they shall be capable of accelerating and decelerating within a time of less than 1 second. If the mechanical system of the robot is in unbalance during these movements, vibrations will arise resulting in deteriorated manufacturing quality. In addition, such a mechanical unbalance requires a higher power output, and therefore the drive motors have to be dimensioned correspondingly stronger.

From, for example, U.S. Pat. No. 4,507,043 it is known, in an industrial robot, to counterbalance the secondary arm of the robot by means of a counterweight. However, the described robot cannot—as a pendulum robot—be suspension-mounted upside-down on an overhead stand structure arranged across a production line. Further, this robot is not suitable for work in places where space is limited, for example for spot welding inside car bodies, etc.

From U.S. Pat. No. 3,750,895 it is further known to arrange, in connection with tower cranes with a horizontal beam, a secondary beam which is linearly displaceable on the first-mentioned beam, said secondary beam being connected by means of wires to a movable counterweight arranged on the opposite side of the crane mast. The task of the counterweight is to reduce the bending moment on the crane mast. In this case, contrary to the case of an industrial robot, it is not a question of a dynamic counterbalancing of an arm system which is rotatable about two axes crossing each other.

DISCLOSURE OF THE INVENTION

The invention aims to provide a device for counterbalancing the arm system of an industrial robot such that vibrations in the robot can be avoided and the necessary motor power be reduced. According to the invention, this is made possible by arranging the secondary arm and the counterweight to be displaceable on the primary arm so that, independently of the position of the secondary arm on the primary arm, the centre of gravity of the arm system is situated on or in immediate proximity to the pivot axis of the primary arm on the stand, whereby the secondary arm and the counterbalance are at the same time linearly displaceable towards and away from each other, respectively, on respective sides of the pivot axis by means of a movement-transmitting mechanism. The movement-transmitting mechanism comprises a rope or chain member, which interconnects the secondary arm and the counterweight, the rope or chain running over deflector wheels at the ends of the primary arm.

To enable the mounting of several robots on an overhead stand with minimum movements and deformations thereof during the work of the robots and with minimum dimensions with regard to its strength and stiffness, there is proposed according to a further development of the invention that robots, whose centres of gravity are substantially stationary independently of the operating position of the robot, are mounted in pairs symmetrically on that part of the stand which is positioned over the production line. By means of this symmetrical location of robots having a stationary centre of gravity, the moments exerted by the robots on the stand will substantially counterbalance each other, resulting in minimum deformations of the stand, which is of considerable importance for the operation of the robot.

According to a suitable embodiment, the robots are fixedly mounted on the opposed side walls of the overhead part of an essentially U-shaped portal extending across the production line.

BRIEF DESCRIPTION OF THE DRAWING

The invention will be described in greater detail below with reference to embodiments shown in the accompanying drawing, wherein.

DESCRIPTION OF THE PREFERRED EMBODIMENTS

Figure 1:
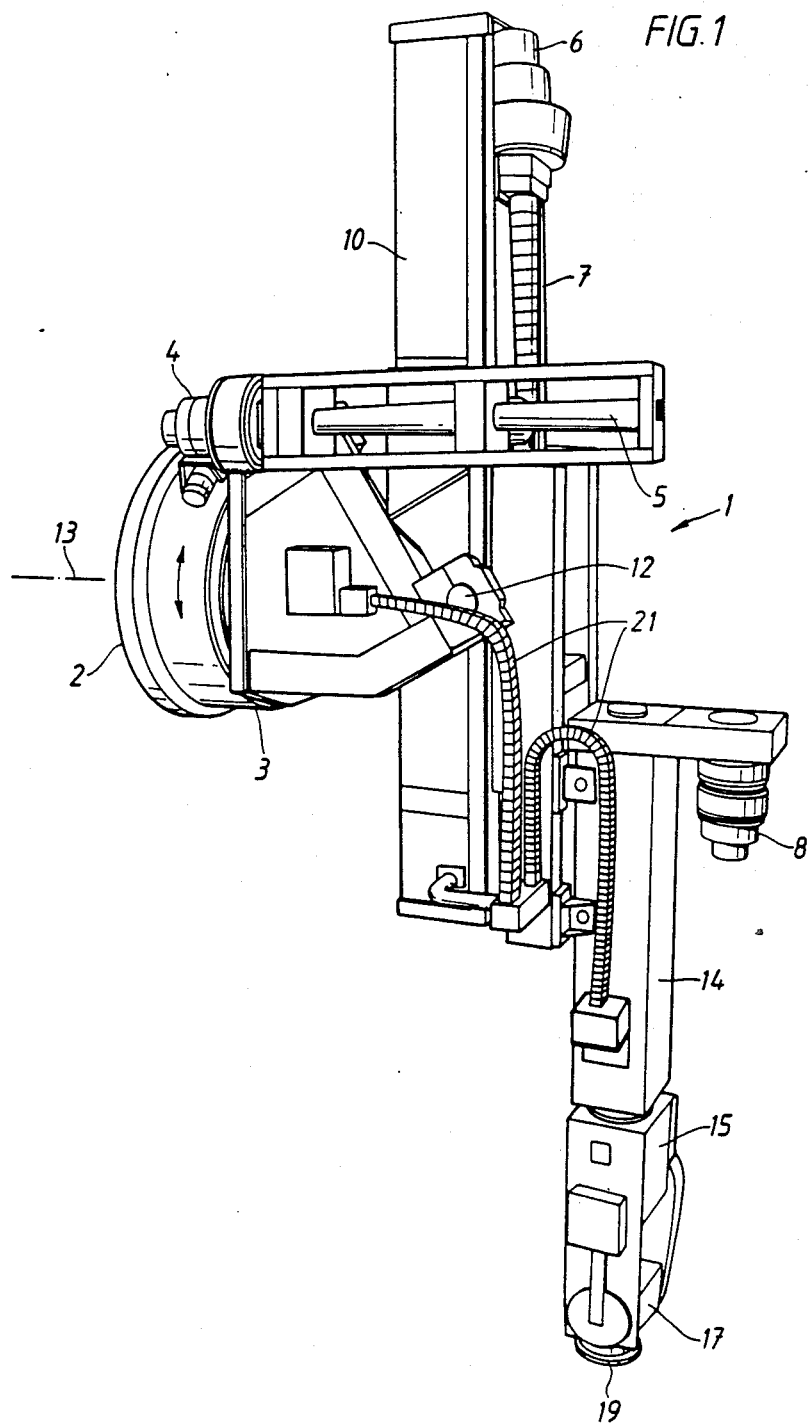
FIG. 1 shows a perspective view of an industrial robot included in a robot installation according to the invention.

The robot 1 shown in FIG. 1 has a base plate 2 on which a robot stand 3 is rotatably journalled about an axis 13. The rotation of the stand is brought about by a drive motor (not shown). A primary robot arm 10 is pivotably journalled about an axis 12 on the stand 3. The rotary motion of the arm 10 is brought about by a drive motor 4 and a ball screw assembly 5. A secondary arm 14 is displaceably journalled on the primary arm 10.

The movement of the secondary arm is brought about by means of a linear drive member comprising a drive motor 6 and a ball screw assembly 7. The front part 15 of the secondary arm is rotatable about the longitudinal axis of the arm with the aid of a drive motor 8. The front arm part 15 supports a tilt housing 17 with a tool attachment 19. The electrical connections between the stand and the secondary arm are brought about via a set of cables 21 comprising power cables and signal cables.

Figure 2:
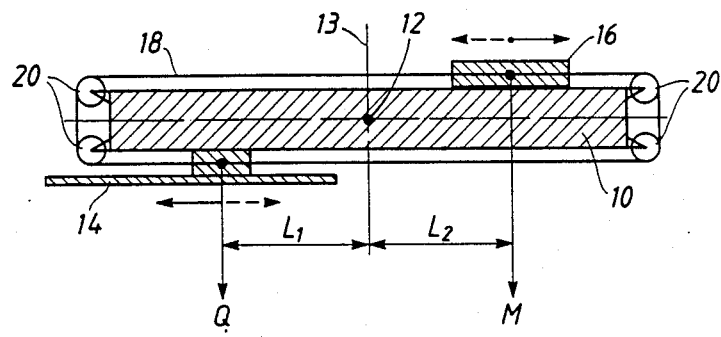
FIG. 2 shows a schematic view of a device for counterbalancing the arm system of the robot.

The arm system of the robot is mechanically counterbalanced by means of a counterweight linearly displaceable inside the primary arm 10. FIG. 2 shows schematically how this is carried out. The primary arm 10 is rotatably journalled in the stand about the axis 12, which is directed perpendicularly to the plane of the drawing. Through the stand, the arm 10 is also rotatable about the axis 13, which in the shown embodiment is perpendicular to the axis 12 so that the intersecting point between the axes 12 and 13 constitutes a pendulum point for the arm system of the robot. On that side of the pivot axis 12 of the primary arm which is opposite to the secondary arm 14, a counterweight 16 is displaceably journalled. The counterweight 16 and the secondary arm 14 are mutually adjusted with respect to their weight and location such that the common centre of gravity for the entire arm system is positioned on or in immediate proximity to the pivot axis 12.

To maintain the centre of gravity on or near the pivot axis 12 or the pendulum point independently of the position of the secondary arm 14 on the primary arm 10, the counterweight 16 is displaceably guided on or in the primary arm 10 on that side of the pivot axis 12 which is opposite to the secondary arm 14 such that the moments around this pivot axis all the time counterbalance each other, that is, so that $Q \cdot L_1 = M \cdot L_2$. For this purpose, the counterweight 16 is movably connected to the secondary arm 14 by means of a rope 18, which runs around rope wheels 20 at the ends of the primary arm 10. The counterweight 16 is adjustable to be adapted to different masses Q.

Figure 3:
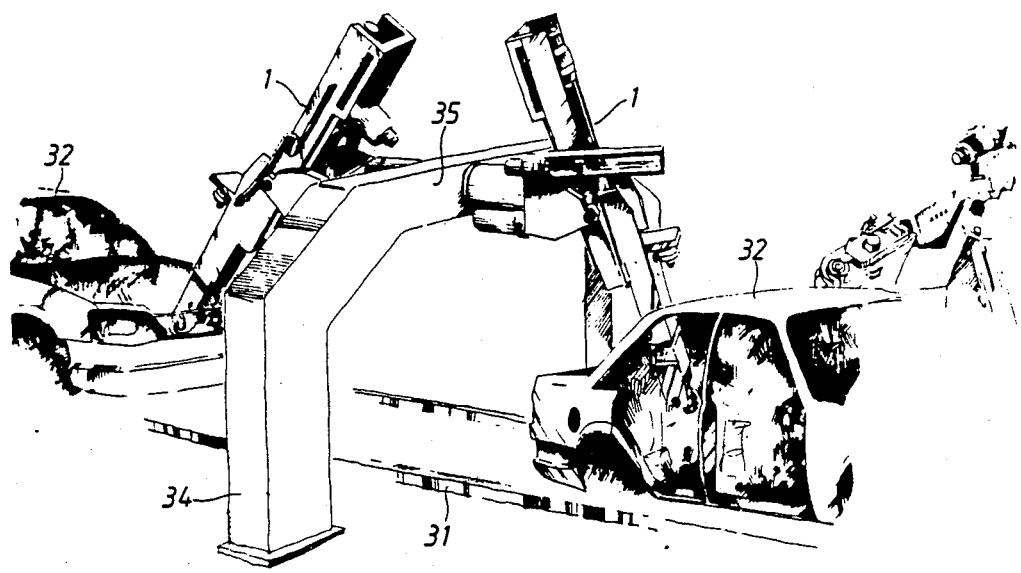
FIG. 3 shows a perspective view of a robot installation with a stand arranged across a production line and supporting two robots.

FIG. 3 shows a production line 31 for the assembly of motor vehicles 32. To obtain short operating times at the different work stations along the production line 31, a plurality of robots 1 must be capable of being used simultaneously at each work station. Because the floor area at the work stations is often limited, the robots are therefore mounted on a stand structure extending across the production line 31. The stand structure has the shape of an essentially U-shaped portal 34.

The robots mounted on the portal are of the design described above with a counterbalancing device, such that the centre of gravity of each robot is stationary independently of the current operating position of the robot. If the robots are of the same size, they are mounted in pairs in a symmetrical relationship to each other on the overhead part 35 of the portal 34. The robots may be mounted in pairs opposite to each other, as shown in FIG. 3, or be mutually displaced in the longitudinal direction of the overhead part 35, that is, in pairs in a symmetrical zigzag configuration. This causes the robots 1 to counterbalance each other so that the portal 34 can be dimensioned optimally small in view of permissible deformations and movements of the stand.

Figure 4:
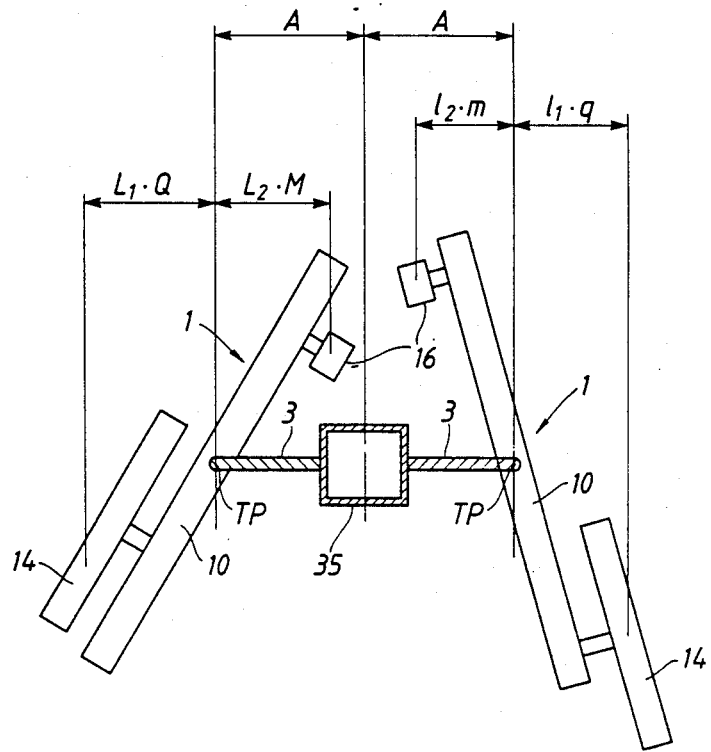
FIG. 4 shows a schematic cross-section through the overhead part of the stand according to FIG. 3.
Figure 5:
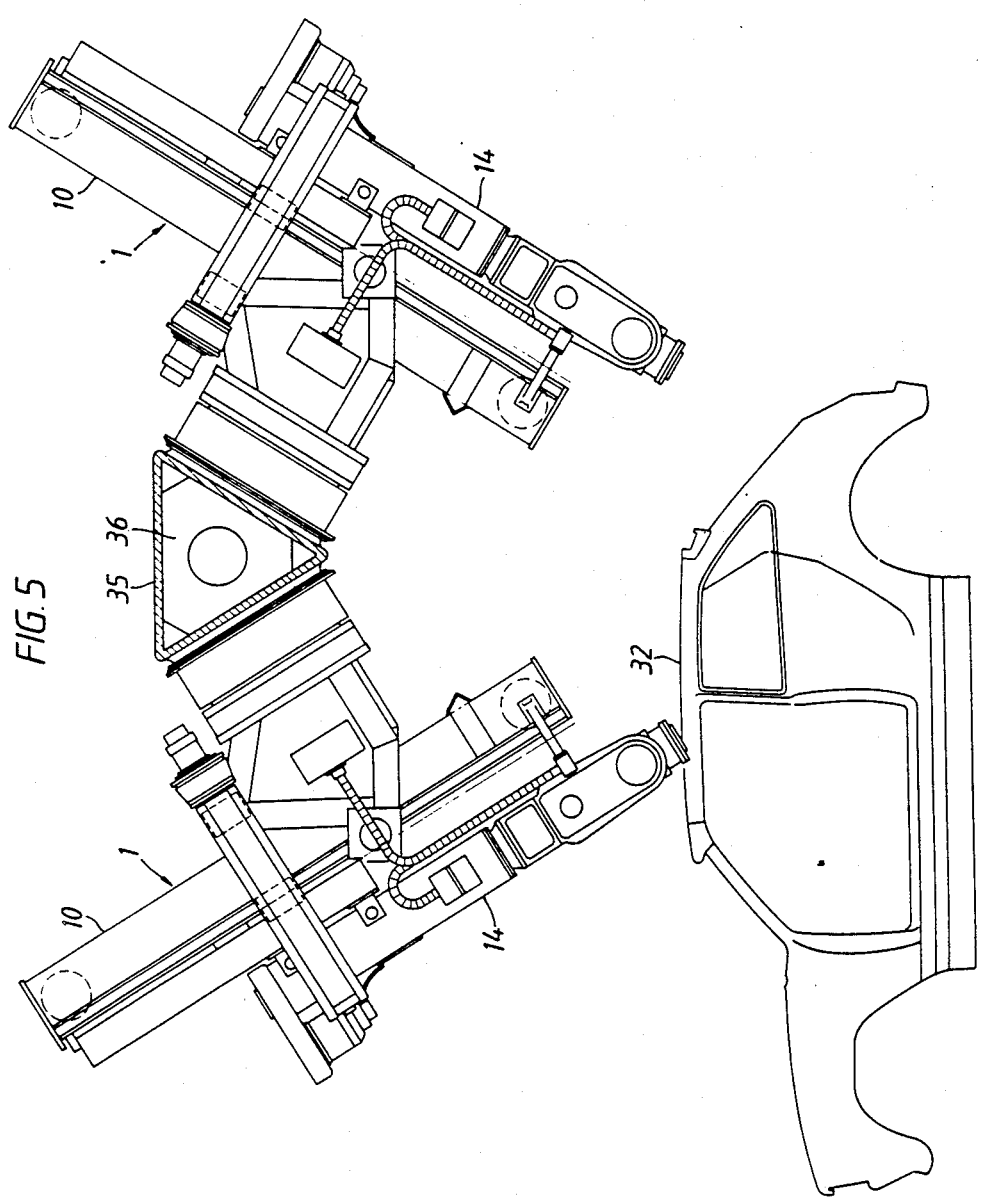
FIG. 5 shows a side view of a modified embodiment of the robot installation according to FIG. 3.

FIG. 4 shows in more detail how two robots 1 are mounted in pairs symmetrically on the overhead part 35 of the portal 34. The robots 1 have a primary arm 10 with a secondary arm 14, mounted displaceably thereon, and a counterweight 16 which is displaceable on the primary arm 10 in such a way that, independently of the movements of the arm system, the centre of gravity TP of the arm system all the time remains at or close to the oscillating or pendulum point of the arm system on the stand part 3 of the robot, which is mounted at the side of the overhead part 35. In this connection the following relationships apply $L_1 \cdot Q \approx L_2 \cdot M$ and $l_2 \cdot m \approx l_1 \cdot q$ FIG. 5 shows a robot installation which requires smaller floor space than that shown in FIG. 3. In the installation according to FIG. 5, the robots are mounted in such a way on the overhead part 35 that the secondary arms of both robots in the neutral position are directed obliquely downwards/inwards towards the work area located below the overlying part. Both the robots can therefore work simultaneously on the same object. In the embodiment shown the overhead part 35 consists of a hollow beam with a triangular cross-section and provided with internal stiffening plates 36.

The invention is not limited to the embodiment shown, but many variants are feasible within the scope of the patent claims. For example, the axes 13 and 12, respectively, of the robot stand and the primary arm need not be directed perpendicular to each other, or even intersect each other. Moreover, in the case of an installation involving several robots mounted on the same overhead part, all the robots need not be of the same size but it is possible, for example, to arrange a larger robot on one side wall of the overhead part and two or more smaller robots on the opposite side wall, provided that the common centre of gravity of the robots lies at the central portion of the overhead part.

What is claimed is:

1. An industrial robot installation including at least one robot of pendulum type, said robot comprising
    a robot stand rotatable about a first axis,
    an arm system including a primary arm and a secondary arm, said primary arm being pivotably journalled in said stand about a second axis oriented transversely across the longitudinal direction of the primary arm, and said secondary arm being movably journalled on said primary arm,
    a counterweight displaceably mounted on said primary arm for counterbalancing said arm system, and
    a movement-transmitting mechanism interconnecting said secondary arm and said counterweight,
    said secondary arm and said counterweight being simultaneously linearly displaceable towards and away from each other, respectively, on respective sides of said second axis such that, independently of the position of said secondary arm on said primary arm, the centre of gravity of said arm system is located on or in immediate proximity to said second axis.

2. A robot installation according to claim 1, in which the movement-transmitting mechanism comprises a rope or chain member (18) which interconnects the secondary arm (14) and the counterweight (16).

3. A robot installation according to claim 2, in which the rope or chain member (18) runs over deflector wheels (20) at the ends of the primary arm (10).

4. A robot installation according to one of claims 1-3, in which the counterweight is so arranged that the arm system is counterbalanced with respect to both of said axes (12, 13).

5. A robot installation according to one of claims 1-3, in which the counterweight and the secondary arm (14) are located on opposite sides of a plane extending through said second axis (12) and being parallel to the longitudinal axis of the primary arm.

6. A robot installation according to claim 1, in which an overhead stand (34), arranged across a production line (31), is supporting several robots (1), whose individual centres of gravity are substantially stationary independently of the operating position of the respective robot, said robots being arranged on opposite side walls of that part (35) of the stand (34) which is positioned over the production line (31) in such a way that the common centre of gravity of the robots lies in the central portion of said overhead stand part (35).

7. A robot installation according to claim 6, in which the robots (1) are arranged symmetrically in pairs on the overhead stand part (35).

8. A robot installation according to claim 6, in which the robots (1) are fixedly mounted on the opposite side walls of the overhead part (35) of an essentially U-shaped portal (34) straddling the production line (31).

9. A robot installation according to claim 6, in which the robots (1) are mounted in pairs opposite to each other on the overhead stand part (35).

* * * * *